United States Patent
Wang et al.

(10) Patent No.: US 11,330,301 B2
(45) Date of Patent: May 10, 2022

(54) METHOD AND DEVICE OF ENCODING AND DECODING BASED ON FREE VIEWPOINT

(71) Applicant: PEKING UNIVERSITY SHENZHEN GRADUATE SCHOOL, Shenzhen (CN)

(72) Inventors: Ronggang Wang, Guangdong (CN); Zhenyu Wang, Guangdong (CN); Wen Gao, Guangdong (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/976,349

(22) PCT Filed: Apr. 8, 2019

(86) PCT No.: PCT/CN2019/081682
§ 371 (c)(1),
(2) Date: Aug. 27, 2020

(87) PCT Pub. No.: WO2020/191813
PCT Pub. Date: Oct. 1, 2020

(65) Prior Publication Data
US 2021/0250613 A1    Aug. 12, 2021

(30) Foreign Application Priority Data

Mar. 28, 2019 (CN) .......................... 201910240995.1

(51) Int. Cl.
*H04N 19/597* (2014.01)
*H04N 19/184* (2014.01)
(Continued)

(52) U.S. Cl.
CPC ......... *H04N 19/597* (2014.11); *H04N 19/184* (2014.11); *H04N 19/188* (2014.11);
(Continued)

(58) Field of Classification Search
CPC .. H04N 19/184; H04N 19/188; H04N 19/597; H04N 19/88; H04N 21/21805; H04N 21/23418
See application file for complete search history.

(56) References Cited

U.S. PATENT DOCUMENTS 9,843,786 B2   12/2017   Shepherd
10,080,010 B2    9/2018   Newton et al.
(Continued)

FOREIGN PATENT DOCUMENTS

CN    101904175 A    12/2010
CN    102098500 A     6/2011
(Continued)

OTHER PUBLICATIONS

International Search Report for corresponding International Application No. PCT/CN2019/081682, filed Apr. 8, 2019.

*Primary Examiner* — Farzana Hossain
(74) *Attorney, Agent, or Firm* — Peter J. Ims; Westman, Champlin & Koehler, P.A.

(57) ABSTRACT

The present application provides a method and a device of encoding and decoding based on free viewpoint, and relates to the technical field of video encoding. The method includes: generating a planar splicing image and splice information based on multiple single-viewpoint videos at a server side; generating a planar splicing video based on the planar splicing image; generating camera side information of the planar splicing video based on camera side information existing in the multiple single-viewpoint videos; and encoding the planar splicing video, the splice information and the camera side information of the planar splicing video to generate a planar splicing video bit stream, and decoding a planar splicing video bit stream to acquire a virtual viewpoint according to viewpoint information of a viewer at client side.

9 Claims, 4 Drawing Sheets

(51) Int. Cl.
*H04N 19/169* (2014.01)
*H04N 19/88* (2014.01)
*H04N 21/218* (2011.01)
*H04N 21/234* (2011.01)

(52) U.S. Cl.
CPC ....... *H04N 19/88* (2014.11); *H04N 21/21805* (2013.01); *H04N 21/23418* (2013.01)

(56) References Cited

U.S. PATENT DOCUMENTS

| | | |
|---|---|---|
| 10,404,961 B2 | 9/2019 | Chan et al. |
| 2012/0148173 A1 | 6/2012 | Shin et al. |
| 2013/0050424 A1 | 2/2013 | Takahashi et al. |
| 2014/0168362 A1* | 6/2014 | Hannuksela ......... H04N 13/161 348/43 |
| 2020/0410754 A1* | 12/2020 | Sugano ................... G06T 15/04 |
| 2021/0076040 A1* | 3/2021 | Abe ..................... H04N 19/119 |

FOREIGN PATENT DOCUMENTS

| | | |
|---|---|---|
| CN | 102934450 A | 2/2012 |
| CN | 105262958 A | 1/2016 |
| CN | 106982366 A | 7/2017 |
| CN | 107071301 A | 8/2017 |
| CN | 107306347 A | 10/2017 |
| CN | 105165008 B | 11/2017 |
| CN | 108475330 A | 8/2018 |
| CN | 108696471 A | 10/2018 |
| CN | 108616742 B | 4/2020 |

\* cited by examiner

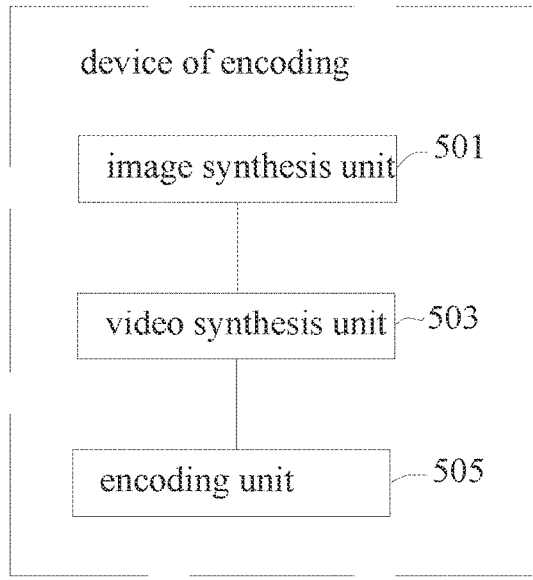

FIG. 5

| decoding a planar splicing video bit stream to acquire a planar splicing image, splice information and camera side information of the planar splicing video at a client side, and wherein the camera side information of the planar splicing video comprises sequence-level camera side information of the planar splicing video and/or image-level camera side information of the planar splicing video | ─S601 |

| acquiring images and corresponding depth images of each channel of multiple single-viewpoint videos according to the planar splicing image and the splice information | ─S603 |

| acquiring camera side information of each channel of the multiple single-viewpoint videos according to the camera side information of the planar splicing video | ─S605 |

| synthesizing the camera side information of each channel of the multiple single-viewpoint videos, and the images and the corresponding depth images of each channel of multiple single-viewpoint videos to acquire a virtual viewpoint according to viewpoint information of a viewer. | ─S607 |

FIG. 6

METHOD AND DEVICE OF ENCODING AND DECODING BASED ON FREE VIEWPOINT

CROSS REFERENCE TO RELATED APPLICATION

This Application is a Section 371 National Stage Application of International Application No. PCT/CN2019/081682, filed Apr. 8, 2019, and claims priority to Chinese Patent Application No. CN201910240995.1, filed Mar. 28, 2019, entitled "a method and a device of encoding and decoding based on free viewpoint", the content of which is incorporated herein by reference.

TECHNICAL FIELD

The present application relates to the technical field of video encoding, and more particularly to a method and a device of encoding and decoding based on free viewpoint.

BACKGROUND

The application of free viewpoint allows viewers to watch videos in the form of continuous viewpoints within a certain range. The viewer can freely select the position and angle of the viewpoint, and the viewing angle is no longer limited to one or several fixed camera angles. Since the free viewpoints are continuous, it is not possible to generate all possible viewpoints for storage and transmission in advance. The existing technology is to generate a video of the specified viewpoint at a server side based on the collected viewpoint information such as the position and angle selected by the viewer at the current moment at client side, and then transferring to the client side for viewers to watch. The existing technology has certain limitations, on one hand, there is a certain delay when the viewpoint information of the client side is transmitted back to the server, which affects the viewing experience; on the other hand, it will cause a huge calculating pressure that makes it difficult to apply on a large scale when there are a large number of client sides watching videos.

Therefore, a new method is needed to improve the viewing experience, reduce the viewing delay, and reduce the computing pressure at the server side.

SUMMARY

The method and the device of encoding and decoding based on free viewpoint provided by the present application are configured to solve problems that the existing technology has certain limitations, on one hand, there is a certain delay when the viewpoint information of the client side is transmitted back to the server, which affects the viewing experience; on the other hand, it will cause a huge calculating pressure that makes it difficult to apply on a large scale when there are a large number of client sides watching videos.

In order to solve the above problems, embodiments of the present application are implemented as follow:

The present application provides a method of encoding based on free viewpoint, including:

generating a planar splicing image and splice information based on multiple single-viewpoint videos at a server side;

generating a planar splicing video based on the planar splicing image;

generating camera side information of the planar splicing video based on a camera side information existing in the multiple single-viewpoint videos; and encoding the planar splicing video, the splice information and the camera side information of the planar splicing video to generate a planar splicing video bit stream.

Optionally, the step of generating a planar splicing image and splice information based on multiple single-viewpoint videos specifically includes steps of:

splicing images collected at the same moment in the multiple single-viewpoint videos in a form of a splicing matrix to generate a first temporary spliced image;

splicing depth images corresponding to the images collected at the same moment in the multiple single-viewpoint videos in a form of a splicing matrix to generate a second temporary spliced image;

splicing the first temporary spliced image and the second temporary spliced image according to a preset splicing manner to generate a planar splicing image.

Optionally, the preset splicing manner refers to that splicing the first temporary spliced image and the second temporary spliced image in a left-right manner or in a top-bottom manner when splicing the first temporary spliced image and the second temporary spliced image.

Optionally, an arrangement relationship of the images collected at the same moment in the multiple single-viewpoint videos in the first temporary spliced image is the same as an arrangement relationship of the depth images corresponding to the images collected at the same moment in the second temporary spliced image, and the images and the corresponding depth images of each channel of multiple single-viewpoint videos are respectively located in same positions of the first temporary spliced image and the second temporary spliced image.

Optionally, the splice information is configured to record information for generating the planar splicing image, including: a number of single-viewpoint of the multiple single-viewpoint videos, a size of the splicing matrix, the preset splicing manner and positions of the first temporary spliced image or the second temporary spliced image in the planar splicing image.

Optionally, the step of generating camera side information of the planar splicing video based on camera side information existing in the multiple single-viewpoint videos specifically includes:

splicing a sequence-level camera side information to be a sequence-level camera side information of the planar splicing video if the sequence-level camera side information existing in the camera side information of the multiple single-viewpoint videos; and splicing an image-level camera side information to be an image-level camera side information of the planar splicing video if the image-level camera side information existing in the camera side information of the multiple single-viewpoint videos.

Optionally, the camera side information includes an information length and an information data.

Optionally, the planar splicing video bit stream includes a sequence header, a sequence-level extended data segment and a plurality of image data, and the image data including an image header and an image-level extended data segment and an image encoding data.

Optionally, the splice information and the sequence-level camera side information of the planar splicing video are stored in the sequence-level extended data segment of the planar splicing video bit stream, and the image-level camera side information of the planar splicing video are stored in the image-level extended data segment of the planar splicing video bit stream.

The present application further provides a device of encoding based on free viewpoint, including:

an image synthesis unit, configured to generate a planar splicing image and splice information based on multiple single-viewpoint videos at a server side;

a video synthesis unit, configured to generate a planar splicing video based on the planar splicing image; and to generate a camera side information of the planar splicing video based on camera side information existing in the multiple single-viewpoint videos; and an encoding unit, configured to encode the planar splicing video, the splice information and the camera side information of the planar splicing video to generate a planar splicing video bit stream.

The present application further provides a method of decoding based on free viewpoint, including:

decoding a planar splicing video bit stream to acquire a planar splicing image, splice information and a camera side information of the planar splicing video at a client side, and wherein the camera side information of the planar splicing video includes a sequence-level camera side information of the planar splicing video and/or an image-level camera side information of the planar splicing video;

acquiring images and corresponding depth images of each channel of multiple single-viewpoint videos according to the planar splicing image and the splice information;

acquiring camera side information of each channel of the multiple single-viewpoint videos according to the camera side information of the planar splicing video; and synthesizing the camera side information of each channel of the multiple single-viewpoint videos, and the images and the corresponding depth images of each channel of multiple single-viewpoint videos to acquire a virtual viewpoint according to viewpoint information of a viewer.

The present application further provides a device of decoding based on free viewpoint, including:

a decoding unit, configured to decode a planar splicing video bit stream to acquire a planar splicing image, splice information and a camera side information of the planar splicing video at a server side, and wherein the camera side information of the planar splicing video includes sequence-level camera side information of the planar splicing video and/or image-level camera side information of the planar splicing video an image analysis unit, configured to acquire images and corresponding depth images of each channel of multiple single-viewpoint videos according to the planar splicing image and the splice information;

a video analysis unit, configured to acquire a camera side information of each channel of the multiple single-viewpoint videos according to the camera side information of the planar splicing video; and a synthesizing unit, configured to synthesize the camera side information of each channel of the multiple single-viewpoint videos, and the images and the corresponding depth images of each channel of multiple single-viewpoint videos to acquire a virtual viewpoint according to viewpoint information of a viewer.

The above at least one technical solution adopted by the embodiments of the present application can achieve the following beneficial effects: in the present application, by generating a planar splicing image and splice information based on multiple single-viewpoint videos at a server side; generating a planar splicing video based on the planar splicing image; generating camera side information of the planar splicing video based on camera side information existing in the multiple single-viewpoint videos; and encoding the planar splicing video, the splice information and the camera side information of the planar splicing video to generate a planar splicing video bit stream. The planar splicing video bit stream is stored and transmitted in a form of a common planar video bit stream. At client side, decoding a planar splicing video bit stream to acquire a planar splicing image, splice information and camera side information of the planar splicing video, and wherein the camera side information of the planar splicing video includes sequence-level camera side information of the planar splicing video and/or image-level camera side information of the planar splicing video; acquiring images and corresponding depth images of each channel of multiple single-viewpoint videos according to the planar splicing image and the splice information; acquiring camera side information of each channel of the multiple single-viewpoint videos according to the camera side information of the planar splicing video; and synthesizing the camera side information of each channel of the multiple single-viewpoint videos, and the images and the corresponding depth images of each channel of multiple single-viewpoint videos to acquire a virtual viewpoint according to viewpoint information of a viewer. Based on the technical solution of the present application, the synthesis of free viewpoints at the client side can be realized, thereby the viewing delay is reduced, the computing pressure at the server side is reduced, and the viewing experience is improved.

BRIEF DESCRIPTION OF THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

FIG. 5 is a schematic diagram a device of encoding based on free viewpoint provided by an embodiment of the present application;

FIG. 6 is a schematic flowchart of a method of decoding based on free viewpoint provided by an embodiment of the present application.

DETAILED DESCRIPTION

In order to enable those skilled in the art to better understand the technical solutions in the present application, the technical solutions in the embodiments of the present application will be described clearly and completely in conjunction with the drawings in the embodiments of the present application. Obviously, the described embodiments are only a part of the embodiments of the present application, but not all the embodiments. Based on the embodiments of the present application, all other embodiments acquired by those of ordinary skill in the art without creative work shall fall within the scope of protection of the present application.

Figure 1:
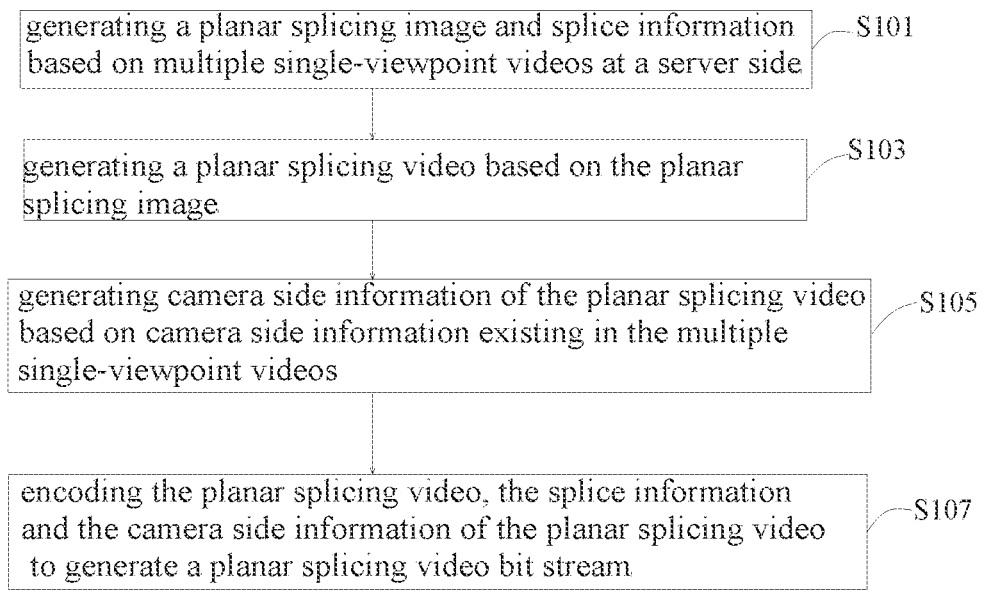
FIG. 1 is a schematic flowchart of a method of encoding based on free viewpoint provided by an embodiment of the present application.

FIG. 1 is a schematic flowchart of a method of encoding based on free viewpoint provided by an embodiment of the present application. The method can includes steps as follow:

Step 101, generating a planar splicing image and splice information based on multiple single-viewpoint videos at a server side. In the present embodiment, the multiple single-viewpoint videos include at least 2 channels of single-viewpoint videos. In specific embodiment, the multiple single-viewpoint videos is spliced in a form of a splicing matrix. A number of viewpoint of the multiple single-viewpoint videos is M*N, among then, the M and N are integer that greater than 0.

In the embodiment of the present application, the step of generating a planar splicing image and splice information based on multiple single-viewpoint videos specifically includes: generating a first temporary spliced image and a second temporary spliced image, and splicing the first temporary spliced image and the second temporary spliced image to generate a planar splicing image. In an embodiment of the present application, splicing images collected at the same moment in the multiple single-viewpoint videos in a form of a splicing matrix to generate a first temporary spliced image; then splicing depth images corresponding to the images collected at the same moment in the multiple single-viewpoint videos in a form of a splicing matrix to generate a second temporary spliced image; and then splicing the first temporary spliced image and the second temporary spliced image according to a preset splicing manner to generate a planar splicing image. It is noted that, in order to ensure the consistency of the image and the corresponding depth image of the single-viewpoint video, an arrangement relationship of the images collected at the same moment in the multiple single-viewpoint videos in the first temporary spliced image is the same as an arrangement relationship of the depth images corresponding to the images collected at the same moment in the second temporary spliced image, and the images and the corresponding depth images of each channel of multiple single-viewpoint videos are respectively located in same positions of the first temporary spliced image and the second temporary spliced image.

In the embodiment of the present application, the preset splicing manner refers to that splicing the first temporary spliced image and the second temporary spliced image in a left-right manner or in a top-bottom manner when splicing the first temporary spliced image and the second temporary spliced image. In a specific embodiment, factors that need to be considered in the design of the preset splicing manner include but are not limited to: try to keep the size of the final planar splicing image close to the size of the ordinary image, such as 4:3, 16:9, etc. and try to reduce splicing seams, application scenarios, the number of multi-channel viewpoints, and the resolution of single-viewpoints.

In the embodiment of the present application, the splice information is configured to record information for generating the planar splicing image, comprising: a number of single-viewpoint of the multiple single-viewpoint videos, a size of the splicing matrix, the preset splicing manner and positions of the first temporary spliced image or the second temporary spliced image in the planar splicing image.

In the embodiment of the present application, the splicing manner of the first temporary spliced image, the second temporary spliced image and the planar splicing image includes but is not limited to: an image splicing algorithm based on template registration, an image splicing algorithm based on image phase correlation, an image splicing algorithm based on feature points, and an image splicing algorithm based on region.

Figure 2:
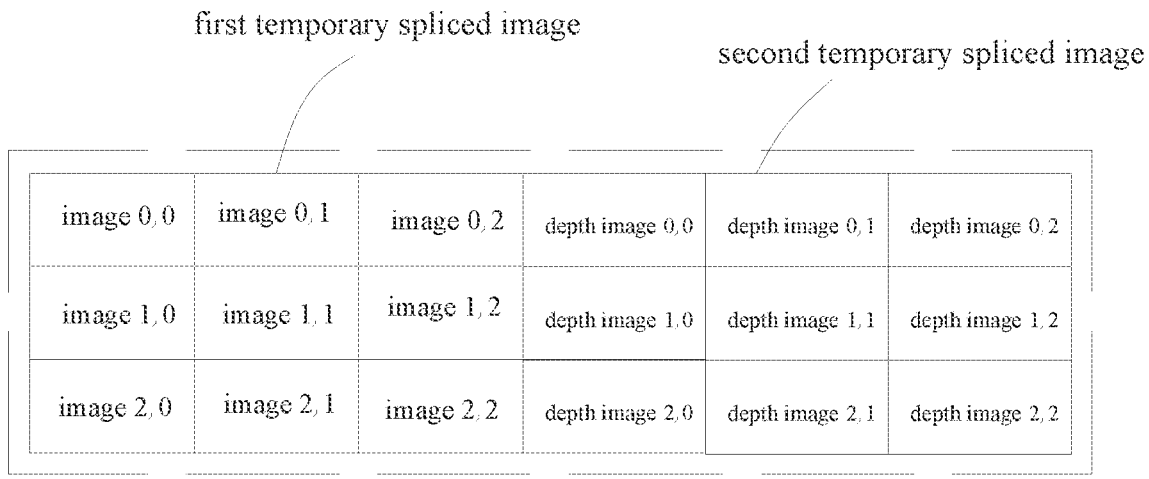
FIG. 2 is a schematic diagram of a method of encoding of a planar splicing image provided by an embodiment of the present application.

In an embodiment of the present application, the multiple single-viewpoint videos includes 9 channels, and adopts the method shown in FIG. 2 to generate the planar splicing image. FIG. 2 is a schematic diagram of a method splicing for a planar splicing image provided by an embodiment of the present application. Specifically, splicing images collected at the same moment in the 9 channels single-viewpoint videos as shown in FIG. 2 to generate the first temporary spliced image; splicing depth images corresponding to the images collected at the same moment in the 9 channels single-viewpoint videos as shown in FIG. 2 to generate the second temporary spliced image; among then, the images in the single-viewpoint video is marked as $image_{x,y}$, the depth images corresponding to the $image_{x,y}$ is marked as depth $image_{x,y}$. then splicing the first temporary spliced image and the second temporary spliced image in a left-right splicing manner to generate the planar splicing image, and the first temporary spliced image is located at left side of the planar splicing image. The generated splice information includes: the number of single-viewpoints being 9, the size of the splicing matrix being 3*3, the preset splicing manner being left-right manner, the first temporary spliced image is located on the left side of the planar splicing image or the second temporary spliced image is located the right side of the planar splicing image.

Step 103, generating a planar splicing video based on the planar splicing image.

Based on the planar splicing images generated in the previous step S101, the planar splicing images at different moments are combined into the planar splicing video.

Step 105, generating camera side information of the planar splicing video based on camera side information existing in the multiple single-viewpoint videos;

In the embodiment of the present application, the camera side information is configured to record related information of the camera, including but not limited to: external parameters of the camera, internal parameters of the camera, lens distortion parameters, aperture, exposure time, exposure compensation parameters, white balance parameters, color temperature, Among them, the external parameters of the camera include but are not limited to the camera position and shooting angle. According to different application scenarios, during the video shooting process, some parameters of the camera side information will remain unchanged, while some parameters of the camera side information will change. If the camera is fixed in an application scenario, the external parameters of the camera remain unchanged during the video shooting process. Similarly, if the moving shooting is required in another application scenario, the external parameters of the camera remain changed during the video shooting process. The composition of the camera side information includes but is not limited to: information length and information data, among then, the information length is configured to record the length of the information data, and the information data is configured to record the related content of the camera side information.

In the embodiment of the present application, the camera side information that remains unchanged in each channel of the multiple single-viewpoint videos during the shooting process is defined as sequence-level camera side information, and the camera side information that changes in each channel of single-viewpoint video during single-viewpoint defined as image-level camera side information.

Figure 3:
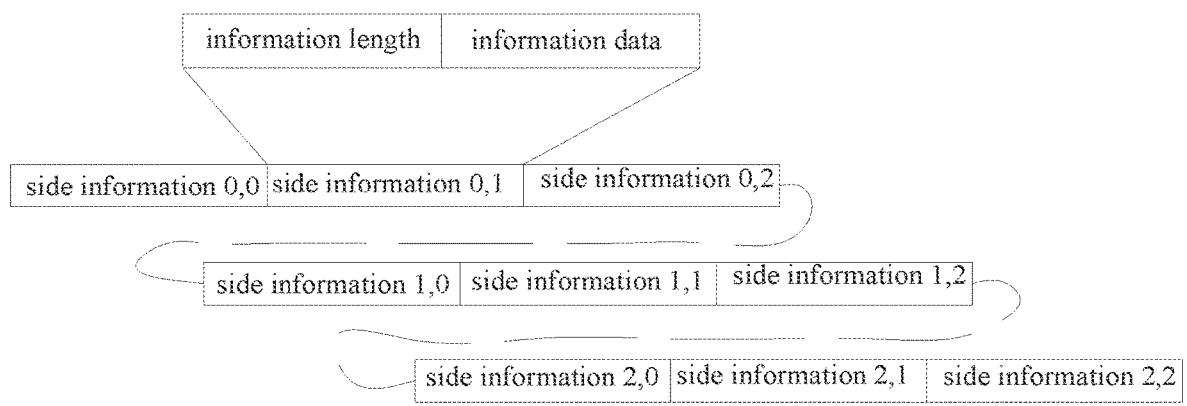
FIG. 3 is a schematic diagram of a method of encoding of camera side information provided by an embodiment of the present application.

In an embodiment of the present application, splicing the sequence-level camera side information existing in each channel of the single-viewpoint video of the multiple single-viewpoint videos to be sequence-level camera side information of the planar splicing video, and splicing the image-level camera side information existing in each channel of the single-viewpoint video of the multiple single-viewpoint videos to be image-level camera side information of the planar splicing video. FIG. 3 is a schematic diagram of a method of splicing for the camera side information provided by an embodiment of the present application. Specifically, splicing the camera side information in each channel of the single-viewpoint video of the multiple single-viewpoint videos one by one in raster scan order according to the arrangement relationship of the images collected at the same moment in the multiple single-viewpoint videos in the first temporary spliced image.

Step 107, encoding the planar splicing video, the splice information and the camera side information of the planar splicing video to generate a planar splicing video bit stream.

Figure 4:
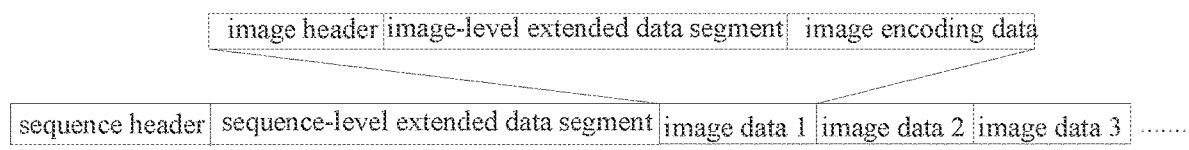
FIG. 4 is a schematic diagram a planar splicing video bit stream provided by an embodiment of the present application.

In the embodiment of the present application, the planar splicing video bit stream includes: a sequence header, a sequence-level extended data segment and a plurality of image data, as shown in FIG. 4. FIG. 4 is a schematic structural diagram of a planar splicing video bit stream provided by an embodiment of the present application. Specifically, the sequence header records information other than necessary data required for decoding, including but not limited to: encoding method and resolution, and the sequence-level extended data segment includes but is not limited to: splice information, sequence-level camera side information of planar splicing video. The image data represents the information of each planar splicing video contained in the planar splicing video bit stream, including but not limited to an image header and an image-level extended data segment and image encoding data, among then, the image header records auxiliary information other than the encoding data in the planar splicing video; the image-level extended data segment includes but is not limited to: the image-level camera side information of the planar splicing video; and the image encoding data is configured for the data encoding in the planar splicing video bit stream.

In the embodiment of the present application, in the step of encoding the planar splicing video, the splice information and the camera side information of the planar splicing video to generate the planar splicing video bit stream, the encoding standards used include but are not limited to: AVS3, AVS2, AVS1, H.265/HEVC, H.264/AVC.

In practical applications, the generated planar splicing video bit stream is stored and transmitted.

Based on the same idea, the embodiments of the present application further provide a device of encoding based on free viewpoint, FIG. 5 is a schematic diagram a device of encoding based on free viewpoint provided by an embodiment of the present application. The device of encoding mainly includes:

an image synthesis unit 501, configured to generate a planar splicing image and splice information based on multiple single-viewpoint videos at a server side;

a video synthesis unit 503, configured to generate a planar splicing video based on the planar splicing image; and to generate camera side information of the planar splicing video based on camera side information existing in the multiple single-viewpoint videos; and an encoding unit 505, configured to encode the planar splicing video, the splice information and the camera side information of the planar splicing video to generate a planar splicing video bit stream.

Based on the same idea, the embodiments of the present application further provide a method of decoding based on free viewpoint, FIG. 6 is a schematic flowchart of a method of decoding based on free viewpoint provided by an embodiment of the present application, the method of decoding specifically includes steps of:

Step 601, decoding a planar splicing video bit stream to acquire a planar splicing image, splice information and camera side information of the planar splicing video at a client side, and wherein the camera side information of the planar splicing video comprises sequence-level camera side information of the planar splicing video and/or image-level camera side information of the planar splicing video;

Step 603, acquiring images and corresponding depth images of each channel of multiple single-viewpoint videos according to the planar splicing image and the splice information;

Step 605, acquiring camera side information of each channel of the multiple single-viewpoint videos according to the camera side information of the planar splicing video; and Step 607, synthesizing the camera side information of each channel of the multiple single-viewpoint videos, and the images and the corresponding depth images of each channel of multiple single-viewpoint videos to acquire a virtual viewpoint according to viewpoint information of a viewer.

Figure 7:
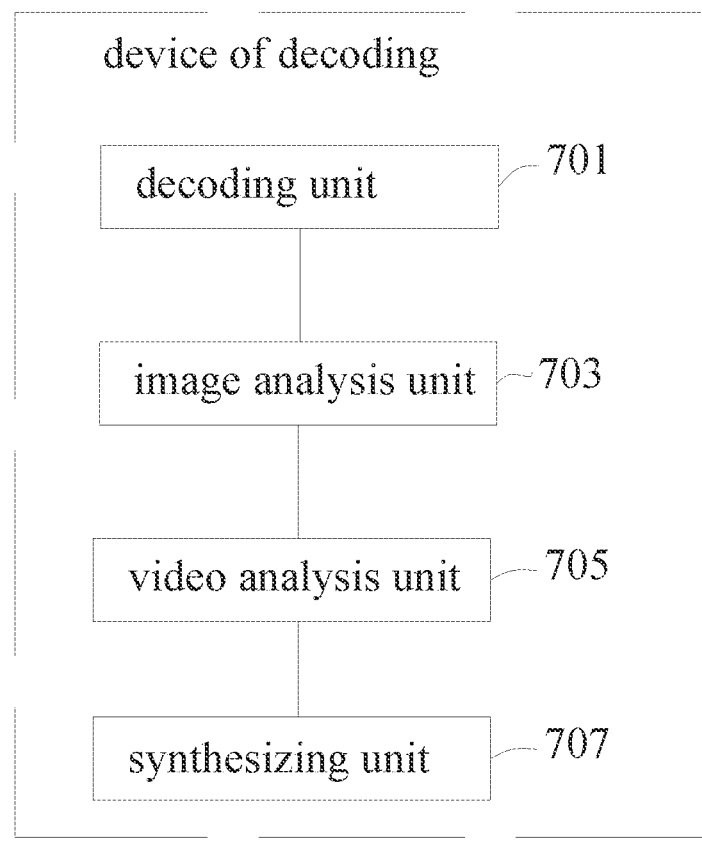
FIG. 7 is a schematic diagram a device of decoding based on free viewpoint provided by an embodiment of the present application.

Based on the same idea, the embodiments of the present application further provide a device of decoding based on free viewpoint, FIG. 7 is a device of decoding based on free viewpoint provided by an embodiment of the present application. The device of decoding specifically includes:

a decoding unit 701, configured to decode a planar splicing video bit stream to acquire a planar splicing image, splice information and camera side information of the planar splicing video at a server side, and wherein the camera side information of the planar splicing video comprises sequence-level camera side information of the planar splicing video and/or image-level camera side information of the planar splicing video an image analysis unit 703, configured to acquire images and corresponding depth images of each channel of multiple single-viewpoint videos according to the planar splicing image and the splice information;

a video analysis unit 705, configured to acquire camera side information of each channel of the multiple single-viewpoint videos according to the camera side information of the planar splicing video; and asynthesizing unit 707, configured to synthesize the camera side information of each channel of the multiple single-viewpoint videos, and the images and the corresponding depth images of each channel of multiple single-viewpoint videos to acquire a virtual viewpoint according to viewpoint information of a viewer.

In the present application, the viewpoint information of viewer includes but is not limited to: viewpoint position, viewing angle orientation, and viewing angle. The viewpoint information of viewer is collected in real time based on the device worn by the viewer.

Using the method of encoding and decoding based on free viewpoint, the encoding can be achieved at the server side, and the synthesis of free viewpoints at the client side can be realized, thereby the viewing delay is reduced, the computing pressure at the server side is reduced, and the viewing experience is improved.

The foregoing describes specific embodiments of the present application. Other embodiments are within the scope of the following claims. In some cases, the actions or steps recited in the claims may be performed in a different order than in the embodiments and still achieve the desired results. In addition, the processes depicted in the drawings do not necessarily require the particular order shown or sequential order to achieve the desired results. In some embodiments, multitasking and parallel processing are also possible or may be advantageous.

The embodiments in the present application are described in a progressive manner. The same or similar parts between the embodiments can be referred to each other, and each embodiment focuses on the differences from other embodiments. In particular, for the embodiments of the device and the electronic device, since they are basically similar to the method embodiments, the description is relatively simple. For the related parts, please refer to the description of the method embodiments.

The device, the electronic device and the method provided in the embodiments of the present application correspond to each other. Therefore, the device and the electronic device also have beneficial technical effects similar to the corresponding method. Since the beneficial technical effects of the method have been described in detail above, therefore, the beneficial technical effects of the corresponding devices and electronic equipment will not be described in detail herein.

In the 1990s, the improvement of a technology can be clearly distinguished from the improvement of hardware (for example, the improvement of the circuit structure of diodes, transistors, switches, etc.) or the improvement of software (the improvement of the process flow). However, with the development of technology, the improvement of many methods and processes can be regarded as a direct improvement of the hardware circuit structure. Designers almost get the corresponding hardware circuit structure by programming the improved method flow into the hardware circuit. Therefore, it cannot be said that the improvement of a method flow cannot be realized by hardware physical modules. For example, a programmable logic device (PLD) (such as a field programmable gate array (FPGA)) is such an integrated circuit whose logic function is determined by the user programming the device. It is up to the designer to "integrate" a digital system on a PLD without having to ask the chip manufacturer to design and manufacture a dedicated integrated circuit chip. Moreover, nowadays, instead of manually making integrated circuit chips, this kind of programming is also mostly implemented with "logic compiler" software, which is similar to the software compiler used in program development and writing, but before compilation the original code of must also be written in a specific programming language, which is called Hardware Description Language (HDL), and HDL is not only one, but there are many, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., currently the most commonly used is Very-High-Speed Integrated Circuit Hardware Description Language (VHDL) and Verilog. Those skilled in the art should also understand that it is easy to obtain the hardware circuit that implements the logic method flow by only slightly programming the method flow in the above hardware description languages and programming it into the integrated circuit.

The controller may be implemented in any suitable manner, for example, the controller may take the form of a microprocessor or processor and a computer-readable medium storing computer-readable program code (such as software or firmware) executable by the processor (microprocessor), Logic gates, switches, application specific integrated circuits (ASICs), programmable logic controllers and embedded microcontrollers. Examples of controllers include but are not limited to the following microcontrollers: ARC 625D, Atmel AT91SAM, MicrochipPIC18F26K20 and Silicone Labs C8051F320, the memory controller can also be implemented as part of the control logic of the memory. Those skilled in the art also know that, in addition to implementing the controller in the form of pure computer-readable program code, which can be logically programmed to enable the controller to use logic gates, switches, special integrated circuits, programmable logic controllers and embedded microcontroller or the like to realize the same function. Therefore, such a controller can be regarded as a hardware component, and the device for implementing various functions included therein can also be regarded as a structure within the hardware component. Or even, the means for realizing various functions can be regarded as both a software module of the implementation method and a structure within a hardware component.

The system, device, module or unit explained in the above embodiments may be specifically implemented by a computer chip or entity, or implemented by a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, when describing the above device, the functions are divided into various units and described separately. Of course, when implementing one or more embodiments of this specification, the functions of each unit may be implemented in the same or more software and/or hardware.

Those skilled in the art should understand that the embodiments of this specification can be provided as methods, systems, or computer program products. Therefore, the embodiments of the present specification may take the form of an entirely hardware embodiment, an entirely software embodiment, or an embodiment combining software and hardware. Furthermore, the embodiments of the present specification may take the form of computer program products implemented on one or more computer usable storage media (including but not limited to disk storage, CD-ROM, optical storage, etc.) containing computer usable program code.

The present application is described with reference to flowcharts and/or block diagrams of methods, devices (systems), and computer program products according to embodiments of the present application. It should be understood that each flow and/or block in the flowchart and/or block diagram and a combination of the flow and/or block in the flowchart and/or block diagram can be implemented by computer program instructions. These computer program instructions can be provided to the processor of a general-purpose computer, special-purpose computer, embedded processing machine, or other programmable data processing device to produce a machine that enables the generation of instructions executed by the processor of the computer or other programmable data processing device A device for realizing the functions specified in one block or multiple blocks of one flow or multiple flows of a flowchart and/or one block or multiple blocks of a block diagram.

These computer program instructions may also be stored in a computer readable memory that can guide a computer or other programmable data processing device to work in a specific manner, so that the instructions stored in the computer readable memory produce an article of manufacture including an instruction device, the instruction device implements the functions specified in one block or multiple blocks in the flowchart one flow or multiple flows and/or block diagrams.

These computer program instructions can also be loaded onto a computer or other programmable data processing device, so that a series of operating steps are performed on the computer or other programmable device to generate computer-implemented processing, The instructions executed on the computer or other programmable device provide steps for implementing the functions specified in the flowchart flow one flow or flow and/or the block diagram one block or multiple blocks.

In a typical configuration, the computing device includes one or more processors (CPUs), input/output interfaces, network interfaces, and memory.

The memory may include non-permanent memory, random access memory (RAM) and/or non-volatile memory in a computer readable medium, such as read only memory (ROM) or flash RAM. Memory is an example of computer-readable medium.

Computer readable medium, including permanent and non-permanent, removable and non-removable media, can store information by any method or technology. The information may be computer readable instructions, data structures, modules of programs, or other data. Examples of computer storage medium include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technologies, read only compact disc read only memory (CD-ROM), digital versatile disc (DVD) or other optical storage, magnetic tape cassettes, magnetic tape magnetic disk storage or other magnetic storage devices or any other non-transmission media can be used to store information that can be accessed by computing devices. As defined herein, computer readable medium does not include temporary computer readable media (transitory media), such as modulated data signals and carrier waves.

It should also be noted that the terms "include", "contain" or any other variant thereof are intended to cover non-exclusive inclusion, so that a process, method, commodity or device that includes a series of elements includes not only those elements, but also includes other elements not explicitly listed, or include elements inherent to this process, method, commodity, or equipment. Without more restrictions, the element defined by the sentence "include one . . . " does not exclude that there are other identical elements in the process, method, commodity or equipment that includes the element.

This description can be described in the general context of computer-executable instructions executed by a computer, such as a program module. Generally, program modules include routines, programs, objects, components, data structures, etc. that perform specific tasks or implement specific abstract data types. The description may also be practiced in distributed computing environments in which tasks are performed by remote processing devices connected through a communication network. In a distributed computing environment, program modules may be located in local and remote computer storage media including storage devices.

The above description of the disclosed embodiments enables those skilled in the art to implement or use the present application. Various modifications to these embodiments will be apparent to those skilled in the art, and the general principles defined herein can be implemented in other embodiments without departing from the spirit and scope of the present application. Therefore, the present application will not be limited to the embodiments shown herein, but should conform to the widest scope consistent with the principles and novel features disclosed in the present application.

What is claimed is:

1. A method of encoding based on free viewpoint, comprising:
    generating a planar splicing image and splice information based on multiple single-viewpoint videos at a server side;
    generating a planar splicing video based on the planar splicing image; generating a camera side information of the planar splicing video based on the multiple single-viewpoint videos; and
    encoding the planar splicing video, the splice information and the camera side information of the planar splicing video to generate a planar splicing video bit stream;
    wherein the step of generating a planar splicing image based on multiple single-viewpoint videos specifically comprises:
        splicing images collected at the same moment in the multiple single-viewpoint videos in a form of a splicing matrix to generate a first temporary spliced image;
        splicing depth images corresponding to the images collected at the same moment in the multiple single-viewpoint videos in of the splicing matrix to generate a second temporary spliced image;
        splicing the first temporary spliced image and the second temporary spliced image according to a preset splicing manner to generate a planar splicing image.

2. The method according to claim 1, wherein the preset splicing manner comprises splicing the first temporary spliced image and the second temporary spliced image in a left-right manner or in a top-bottom manner when splicing the first temporary spliced image and the second temporary spliced image.

3. The method according to claim 1, wherein an arrangement relationship of the images collected at the same moment in the multiple single-viewpoint videos in the first temporary spliced image is the same as an arrangement relationship of the depth images corresponding to the images collected at the same moment in the second temporary spliced image, and the images and the corresponding depth images of each channel of multiple single-viewpoint videos are respectively located in same positions of the first temporary spliced image and the second temporary spliced image.

4. The method according to claim 1, wherein the splice information is configured to record information for generating the planar splicing image, comprising: a number of single-viewpoint of the multiple single-viewpoint videos, a size of the splicing matrix, the preset splicing manner and positions of the first temporary spliced image or the second temporary spliced image in the planar splicing image.

5. The method according to claim 1, wherein the step of generating camera side information of the planar splicing video based on camera side information existing in the multiple single-viewpoint videos specifically comprises:

splicing, if a sequence-level camera side information existing in the camera side information of the multiple single-viewpoint videos, the sequence-level camera side information to be a sequence-level camera side information of the planar splicing video; and splicing, if an image-level camera side information existing in the camera side information of the multiple single-viewpoint videos, the image-level camera side information to be an image-level camera side information of the planar splicing video.

6. The method according to claim 1, wherein the camera side information comprises an information length and an information data.

7. The method according to claim 1, wherein the planar splicing video bit stream comprises a sequence header, a sequence-level extended data segment and a plurality of image data, and the image data comprising an image header and an image-level extended data segment and an image encoding data.

8. The method according to claim 7, wherein the splice information and the sequence-level camera side information of the planar splicing video are stored in the sequence-level extended data segment of the planar splicing video bit stream, and the image-level camera side information of the planar splicing video are stored in the image-level extended data segment of the planar splicing video bit stream.

9. The method according to claim 5, wherein the camera side information comprises an information length and an information data.

* * * * *